United States Patent [19]
Berkowitz

[11] Patent Number: 4,593,272
[45] Date of Patent: Jun. 3, 1986

[54] COMMUNICATION SYSTEM POWER ARRANGEMENT

[75] Inventor: Paul R. Berkowitz, Red Bank, N.J.

[73] Assignee: AT&T Information Systems Inc., Middletown, N.J.

[21] Appl. No.: 639,723

[22] Filed: Aug. 13, 1984

[51] Int. Cl.[4] ............................................. G08B 23/00
[52] U.S. Cl. ..................... 340/500; 179/8 R; 179/70; 179/77; 179/175.2 R; 340/333
[58] Field of Search ........................ 340/653, 500, 333; 179/70, 77, 175.2 C, 175.2 R, 8 A, 8 R

[56] References Cited

U.S. PATENT DOCUMENTS

| | | | |
|---|---|---|---|
| 2,802,952 | 8/1957 | Fairweather | 307/57 |
| 3,704,380 | 11/1972 | Cohn | 307/52 |
| 3,760,105 | 9/1973 | Puccini | 179/8 A |
| 4,279,020 | 7/1981 | Christian et al. | 364/900 |
| 4,356,403 | 10/1982 | Mohat | 307/60 |

OTHER PUBLICATIONS

Radio Shack Dictionary of Electronics, 1978–1979 Unabridged, Howard W. Sams & Co., Inc., Indianapolis, Indiana 46268.
IEEE Standard Dictionary of Electrical and Electronic Terms, ANSI/IEEE St.1100-1984 published by The Institute of Electrical and Electronics Engineers, Inc., New York, N.Y.
INTELEC-1981 Proceedings-London, "Stored-Program Control of DC Power Plants" by T. V. Papathomas et al., pp. 18-23.

Primary Examiner—James L. Rowland
Assistant Examiner—Daniel Myer
Attorney, Agent, or Firm—Frederick B. Luludis

[57] ABSTRACT

A transient power alarm is often the result of a traffic overload placed on a communication system circuit carrier circuit. The disclosed power control arrangement recognizes such transient power alarms and outputs a special message to alert the system user to the possibility that traffic grading across carrier is unbalanced. The control arrangement also monitors the time that the system is powered solely by reserve battery and sheds its traffic load if the time that the system is operating solely on reserve battery exceeds a first threshold. Also, the system is programmed to automatically disable itself if the reserve battery time exceeds a second threshold.

14 Claims, 7 Drawing Figures

INITIALIZATION - AC POWER RESTORED

| ALARM TYPE | CIRCUIT ADDRESS |
|---|---|
| ⋮ | |
| ALARM TYPE | CIRCUIT ADDRESS |
| TRAFFIC COUNT | CIRCUIT ADDRESS |
| ⋮ | |
| TRAFFIC COUNT | CIRCUIT ADDRESS |
| PRESET VALUE | |
| SAVED TRAFFIC COUNT | CIRCUIT ADDRESS |
| ⋮ | |
| SAVED TRAFFIC COUNT | CIRCUIT ADDRESS |
| PRESET VALUES | |

| ALARM - ADDRESS - TYPE - REMARK |
|---|

COMMUNICATION SYSTEM POWER ARRANGEMENT

TECHNICAL FIELD

The invention relates to power control arrangements for telephone communication and other systems.

BACKGROUND OF THE INVENTION

Power supplies in, for example, telephone communication systems, are typically designed to power only thirty to forty percent of the station sets and lines connecting thereto. This design criterion is based on probability studies that show that during a typical busy hour, only thirty to forty percent of the lines connecting to a group of port circuits that share a power supply are busy at any one time. However, a problem arises with these power schemes when traffic is not equally graded across such groups. For example, in typical user-maintained business communication systems it is likely that unbalanced traffic grading will occur across the switch as a result of system growth.

In an architecture where, for economic and reliability reasons, separate modular power supplies are provided for each shelf, or circuit carrier, of plug-in circuit cards, one or more circuit carrier power supplies will most likely experience an overload due to improper traffic grading, thereby resulting in degraded service or a circuit carrier power failure. An obvious solution to this problem is to provide larger circuit carrier power supplies to account for improper or unbalanced traffic across circuit carriers. This approach, however, is unduly expensive.

Further, prior power distribution arrangements typically include a large centralized power supply for supplying system power. Such arrangements can include a large battery that is used to supply system power whenever the centralized power arrangement becomes inoperable. Typically, the reserve battery continues to supply power until its capacity diminishes to a point where it cannot properly power the system. Thereafter, when the centralized power system is restored to service, the battery is recharged. Typically, the time required to fully recharge a discharged battery is very long. Thus, communication systems using such power arrangements are usually disabled for quite a period of time if the centralized power system becomes inoperable during the battery recharge period.

SUMMARY OF THE INVENTION

In accordance with my invention, the level of traffic processed by each circuit carrier in a communication system is monitored. If a communication system circuit carrier experiences transient power failures and there is a substantial disparity between the level of traffic that is processed by that circuit carrier and the level of traffic that is processed by other circuit carriers, then a message is outputted alerting the user to the possibility that the traffic grading across circuit carriers is unbalanced.

Further, in accordance with another feature of my invention, the time interval during which a communication system is solely operating on reserve battery is monitored. If this time interval exceeds a first threshold, then the system places itself in an emergency mode, sheds its traffic load and denies all new requests for service. If the time interval reaches a second threshold, then the system automatically disables itself. If power is restored during the emergency mode, then the system is automatically restored to service and resumes call processing by accepting new requests for service.

BRIEF DESCRIPTION OF THE DRAWING

These and other features together with the operation and the utilization of the present invention will be more fully understood from the following description and accompanying drawing in which.

DETAILED DESCRIPTION

Figure 1:
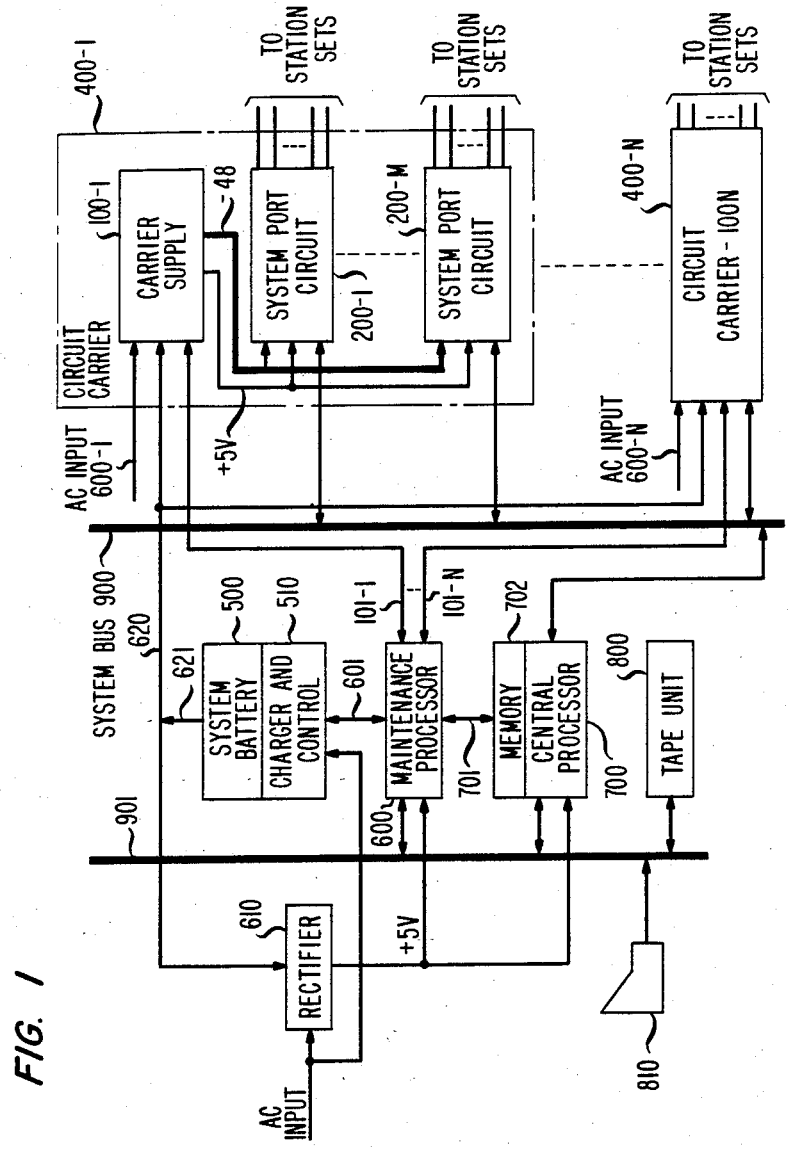
FIG. 1 is a block diagram of a distributed processor communication system in which is used a modular power arrangement embodying the principles of the invention.

FIG. 1 shows a modular communication system in which the invention may be advantageously practiced. Each circuit carrier of N circuit carriers 400-1 to 400-N, such as circuit carrier 400-1, is provided with a colocated independent circuit carrier power supply, such as power supply 100-1. Circuit carrier power supply 100-1 is powered by commercial AC power inputted via lead 600-1 and is also powered by approximately +150 volts DC supplied by system battery 500 via lead 620.

Circuit carrier power supply 100-1 converts the inputted commercial AC power or battery voltage into −48 Volts DC, and +5 Volts DC, which, in turn, is supplied to each of M circuit carrier port circuits 200-1 through 200-M. As will be disussed below, each circuit carrier port circuit, in turn, supplies −48 Volts to system station sets via individual battery feed circuits.

Further in FIG. 1, buses 101-1 through 101-N are each representative of a two-lead connection between respective power supplies and a maintenance processor 600. Consider, for example, bus 101-1. One lead (STOP shown in FIG. 2) of bus 101-1 permits maintenance processor 600 to activate (start) or deactivate (stop) power supply 100-1. The second lead (ALM shown in FIG. 2) of bus 101-1 is an alarm lead which is activated from within power supply 101-1 whenever the latter experiences a power fault or a power overload condition. An active alarm lead is reset by maintenance processor 600 by first deactivating and then activating power supply 101-1 via lead STOP of bus 101-1.

Maintenance processor 600 continuously scans each alarm lead of buses 101-1 through 101-N. If a particular alarm lead is found to be active, maintenance processor 600 sets in memory 702, via bus 701, an alarm flag specifically assigned to the activated alarm lead. In turn, central processor 700, which is powered by +5 volts outputted by rectifier 610, periodically inspects the alarm flags. As will be discussed below, if a particular alarm flag is found to be set, central processor 700 will try to clear the corresponding active alarm lead by directing maintenance processor 600, via interprocessor communication bus 901, to reset the respective circuit carrier supply.

Figure 2:
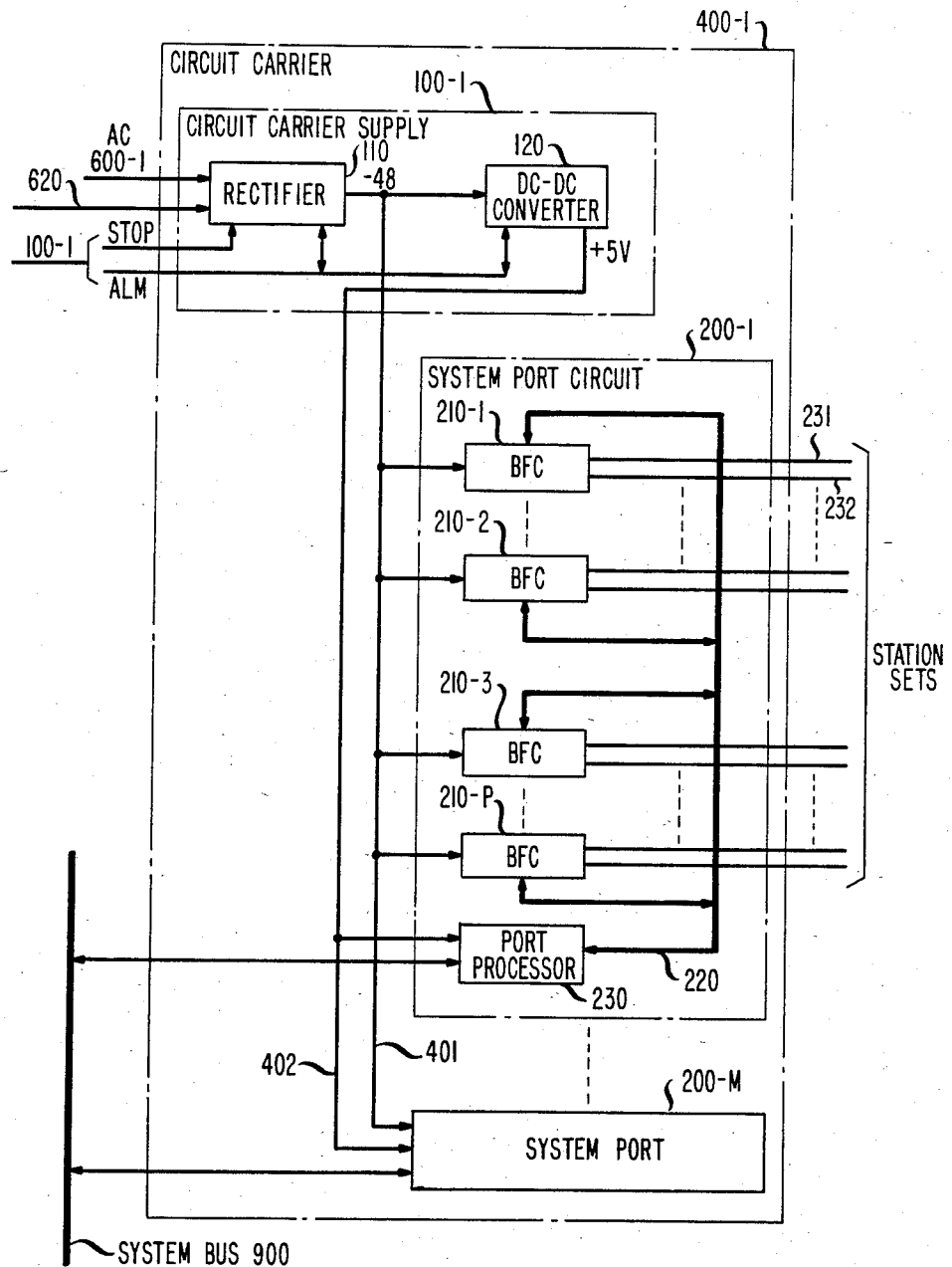
FIG. 2, is a block diagram of the system carrier power arrangement.

Referring now to FIG. 2, it is seen that each port circuit, for example, system port circuit 200-1 of circuit carrier 400-1, comprises a port processor, such as port processor 230 and a plurality of Battery Feed Circuits (BFC), such as BFCs 210-1 through 210-P. Each BFC, such as BFC 210-1, accepts −48 volts from circuit carrier supply 100-1 via lead 401 and extends that potential and system ground potential to an associated station set (not shown) via a pair of leads, such as leads 231 and 232, respectively.

In operation, a station set connected to BFC 210-1 is supplied loop current via leads 231 and 232 and, typically, only draws electrical current when in the off-hook (request for service) state. The flow of electrical current in leads 231 and 232 is detected by BFC 210-1, which in turn, notifies port processor 230 of this via bus 220. Port processor 230, in turn, notifies central processor 700, via time division bus 900, of the change in the status of the station set connecting to BFC 210-1. Central processor 700 uses this information to update a current traffic count that it maintains for each circuit carrier.

Figure 3:
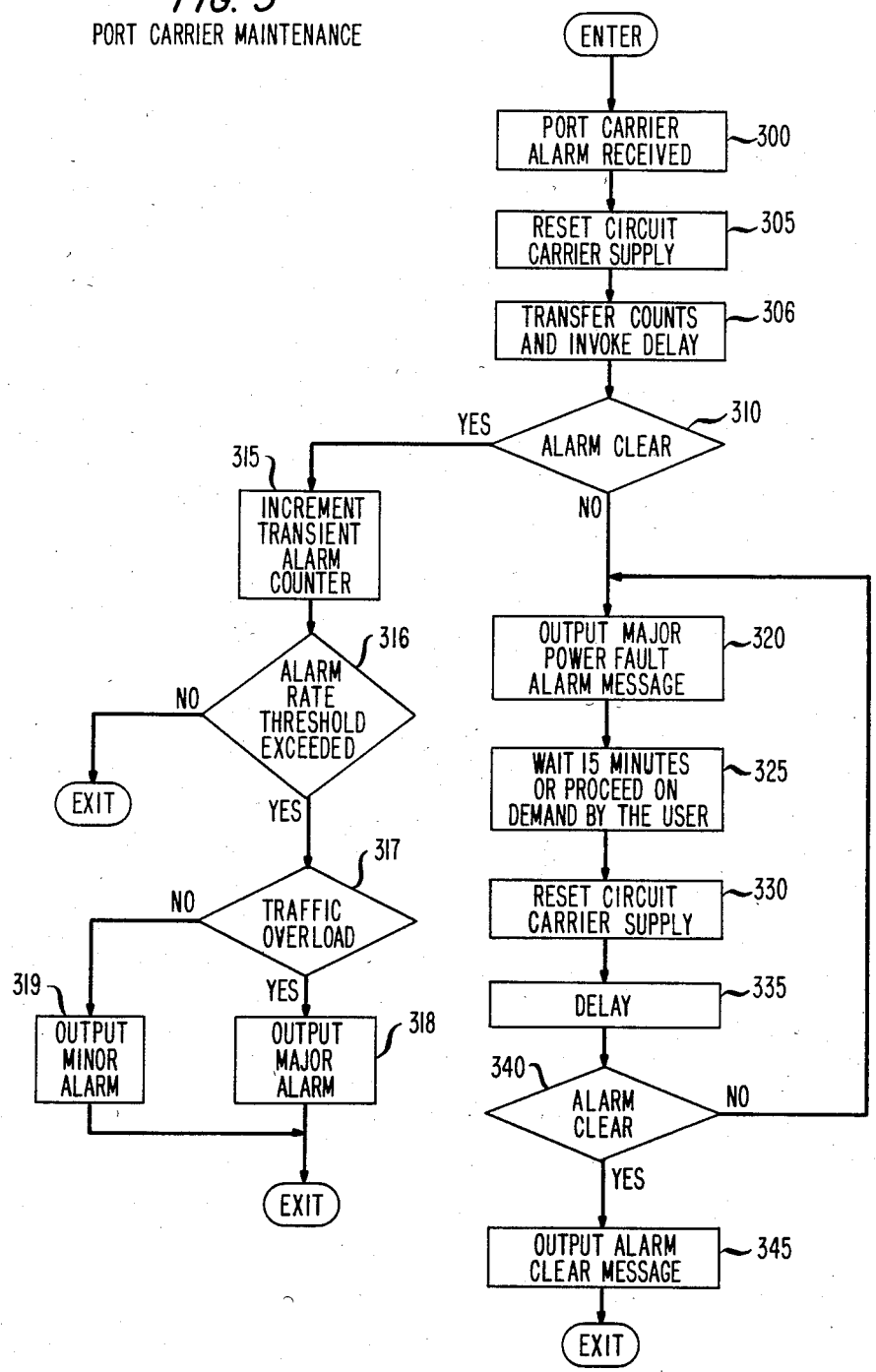
FIG. 3 is a flow chart of a maintenance program detailing the overload strategy invoked within the system of FIG. 1 upon receiving a port circuit carrier alarm.

Referring now to FIG. 3, there is shown a flow chart of the program logic that is invoked within central processor 700 upon the reception of a circuit carrier alarm. The logic illustrated in FIG. 3 is the mechanism by which, in accordance with the invention, central processor 700 determines whether traffic grading across the circuit carriers is balanced properly.

Briefly, the overall logic flow is as follows. Upon noting an active alarm flag, central processor 700 attempts to clear the associated active alarm lead by directing maintenance processor 600 to reset the corresponding circuit carrier power supply. If the active alarm lead clears (deactivates), a transient alarm counter associated with that alarm lead is incremented by central processor 700.

The transient alarm counter filters the effect of a transient alarm on the system, such alarms being tolerated when their frequency of occurrence is small. However, central processor 700 considers a transient alarm indicative of a potential problem when the rate at which such alarms are occurring reaches a system alarm threshold. The alarm counters are periodically cleared by another central processor 700 program as a mechanism for establishing an alarm rate for a respective alarm lead over a predetermined period of time. Thus, upon incrementing an alarm counter, central processor 700 compares the value contained in the counter with the alarm rate threshold to determine if the value of the counter has reached the system alarm rate threshold. If the threshold has been exceeded, the further task is to determine if the excessive alarm rate is due to improper traffic grading. To this end, central processor 700 compares the traffic count associated with the circuit carrier power supply that originated the alarm with a system traffic threshold. If the traffic count exceeds the traffic threshold and also exceeds the traffic count associated with each of the other circuit carrier circuits, then the system user is notified of the possibility that the traffic across the circuit carriers is not properly graded.

On the other hand, if the attempt to clear the active alarm lead is not successful, central processor 700 outputs an alarm message to this effect and attempts to clear the alarm every 15 minutes in order to restore the faulty circuit carrier supply to service, in which case a message to this effect is outputted.

Turning now to the specifics of FIG. 3, central processor 700 notes at block 300 that a circuit carrier alarm flag has been set by maintenance processor 600 and, at block 305, directs maintenance processor 600 to reset the corresponding circuit carrier supply via lead STOP and to reset the associated alarm flag.

At block 306, central processor 700 saves the circuit carrier traffic counts by transferring the contents of the counters to another portion of the system memory 702 (FIG. 6) in order to retain a snapshot of the level of traffic being processed by each circuit carrier at the time that the circuit carrier alarm occurred. Central processor 700 then waits a number of system cycles to allow sufficient time for the activated alarm lead to clear. After the delay, the program proceeds to block 310 to determine if the active alarm lead has in fact cleared. Central processor 700 makes this determination by determining whether the associated alarm flag stored in memory 702 has again been set. If it has not, i.e., the determination indicates that the previously active alarm lead has cleared, the program transfers to block 315. Otherwise the program proceeds to logic block 320.

At block 315, the transient overload counter, which, as mentioned above, is stored in memory 702 and which is associated with the suspected circuit carrier alarm lead, is incremented. At block 316, the value contained in the counter is compared against a predetermined system alarm rate threshold. If the value of the transient counter equals or exceeds the system alarm rate threshold, then the saved traffic count associated with the suspected circuit carrier is compared with those associated with the other system circuit carriers at block 317. If the traffic being processed by the suspected circuit carrier is greater than the traffic being processed by other circuit carriers and is within 95 percent of the circuit carrier traffic capacity, block 318 outputs a major alarm message to maintenance terminal 810 (FIG. 1), via bus 901, and denies service to new requests for service inputted via BFC circuits associated with the suspected carrier. The outputted alarm message indicates that the suspected circuit carrier is in a traffic overload condition and may further indicate the possibility that system traffic is not properly graded across system circuit carriers. As a result of the major alarm message, the system user may elect to regrade the traffic across the system circuit carriers or to add a circuit carrier to the system to relieve the traffic overload placed on the suspected circuit carrier.

If the result of the test performed at block 317 is NO, the program transfers to block 319, at which point the system outputs a minor alarm message to the maintenance terminal. The outputted minor alarm message is indicative of the transient nature of the power alarm.

Returning now to block 310, if the fault contained in the suspected circuit carrier is not cleared by recycling the faulty circuit carrier power supply, then, as previously noted, block 310 falls through to block 320 at which point a major alarm message is outputted to the system user via the maintenance terminal. The program then proceeds to block 325 and starts a 15 minute timer. At the end of 15 minutes, or in response to a demand by the user to reset the faulty circuit carrier power supply, the program proceeds to block 330.

At block 330, the logic discussed in connection with block 305 is repeated. At block 335, as with block 306, the program waits a number of system cycles before determining whether the active alarm lead has cleared. At block 340, as with block 310, the program determines whether the active alarm lead has cleared. If the active power alarm lead has not cleared, the program transfers to block 320 to output a major alarm message. Otherwise, the program proceeds to block 345. At block 345, the program outputs a message to maintenance terminal 810 noting that the fault has cleared.

Figures 5, 6, 7:
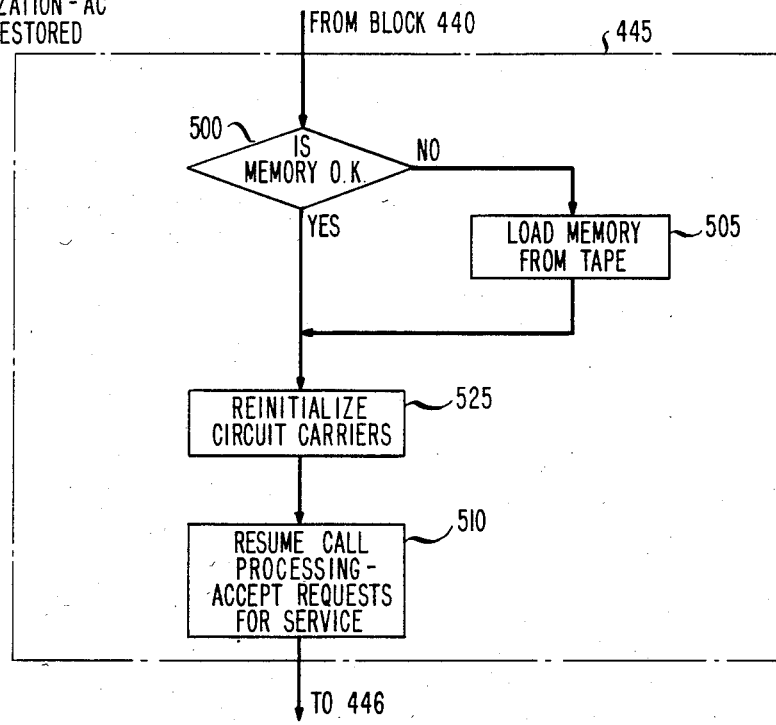
FIG. 5 is a maintenance program flow chart showing the logic that is invoked when A.C. power is restored after a failure.
FIG. 6 is a diagram of a portion of system memory that is reserved for the storage of circuit carrier alarm flags and circuit carrier traffic counts.
FIG. 7 is a diagram of the format of system alarm messages.

Referring now to FIG. 6, there is shown a portion of memory 702 that is reserved for the storage of alarm flags representative of alarms received from respective circuit carrier supplies. The field noted "alarm type" identifies the type of alarm and the field noted as "circuit address" identifies the circuit that transmitted the alarm. As shown, a portion of memory 702 is also reserved for a plurality of traffic counters (one for each system circuit carrier). A portion of memory 702 is also reserved for the storage of saved traffic counts and for the storage of the preset values discussed below.

Referring now to FIG. 7, there is shown a typical format for an alarm message in which the "address" field identifies the circuit which transmitted an alarm, the "type" field identifies the type of alarm received and the "remarks" fields identifies the possible cause of the alarm, such as traffic overload.

As mentioned previously, prior communication systems typically use a large battery to power the system whenever there is a loss of commercial AC power. The battery typically continues to power the system until its capacity diminishes to the point where it cannot properly power the system. When AC power is restored, a battery charging cycle is automatically invoked to replenish the battery. However, such charging cycles are very long, making the system highly vulnerable to failure in the event of a subsequent loss of AC power.

In accordance with a feature of the invention, whenever a loss of AC power occurs, the system switches to reserve battery 500 and central processor unit 700 starts a 10 second timer. If commercial power is not restored within 10 seconds, then central processor 700 conserves system power by directing maintenance processor 600 to disable (stop) all system circuit carrier supplies in order to shed system traffic. Central processor 700 then starts a 10 minute timer. If AC power is not restored within 10 minutes, central processing unit 700 then directs maintenance processor 600 to disconnect reserve battery 500 thereby disabling the system. This logic is based on the notion that more than 99 percent of AC power outages last less than 10 minutes.

Returning now to FIG. 1, maintenance processor 600 monitors and controls system battery 500 as well as charger and control unit 510 via bus 601. Bus 601 is a group of control and alarm leads which allows maintenance processor 600 to communicate with charger and control unit 510. Unit 510 monitors the presence of AC power and automatically switches battery 500 into the system during an absence of AC power. Unit 510 notifies maintenance processor 600, via bus 601, whenever battery 500 is switched into the system and whenever the electrical capacity of battery 500 is not sufficient to properly power the system.

Referring again to FIG. 2, it is seen that circuit carrier supply 100-1 includes a switching rectifier 110 and DC-DC converter 120. It is the former that converts inputted commercial AC power or inputted −150 volts DC from battery 500 into −48 volts as previously mentioned. The latter voltage is supplied not only to system port battery feed circuits (BFC) 210-1 through 210-M, via power lead 401, as previously mentioned, but also to DC-DC converter 120. The latter supplies +5 volts DC to the circuit carrier port processors, such as port processor 230, via lead 402. Maintenance processor 600 controls rectifier 110 via lead STOP of bus 101-1 as means of turning rectifier 110 on and off (resetting). Alarm lead ALM-1 is activated by either rectifier 110 or DC-DC converter 120 whenever a fault condition or power overload condition occurs in those circuits.

Figure 4:
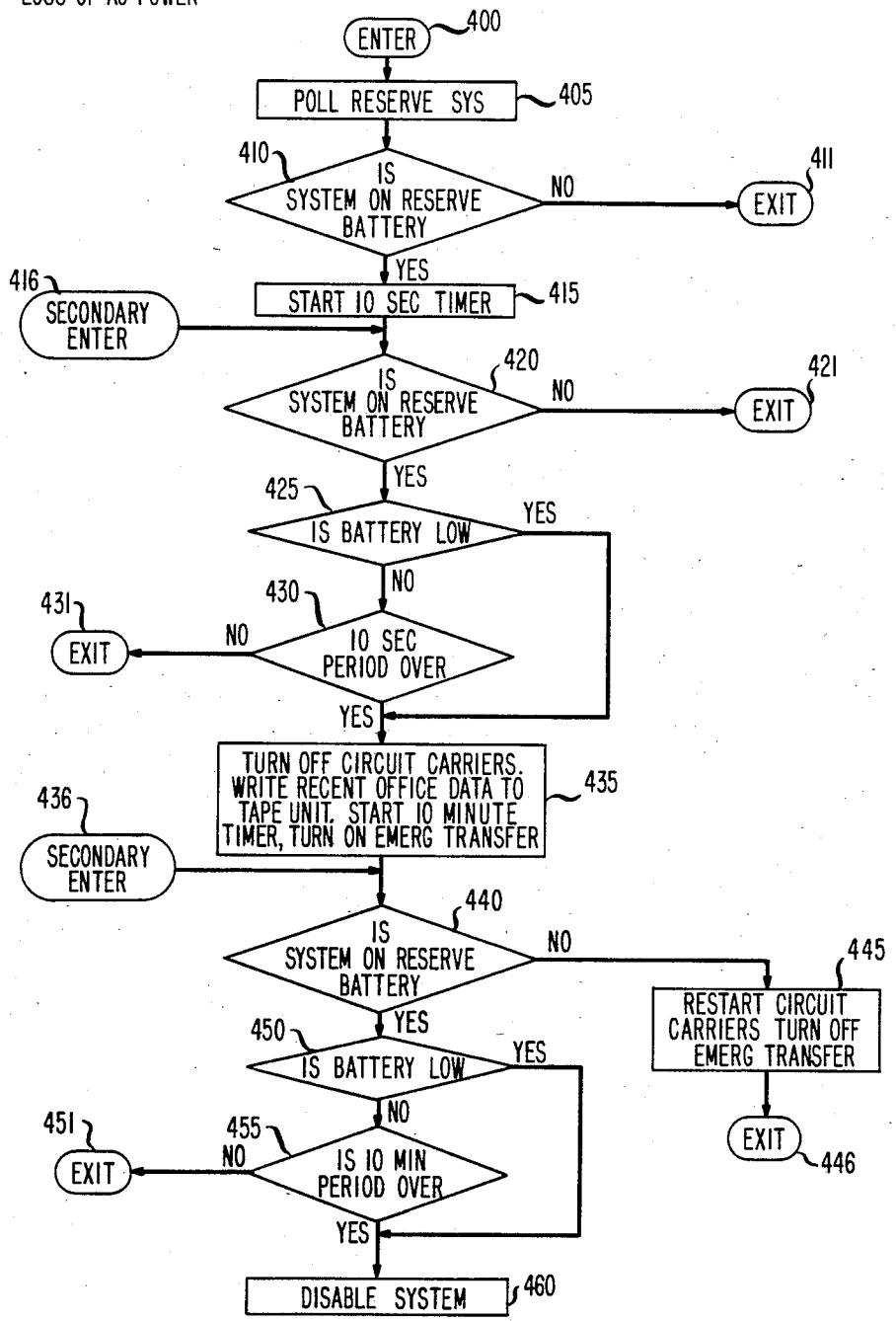
FIG. 4 is a maintenance program flow chart detailing the logic used within the system of FIG. 1 to maintain the modular power arrangement on a system-wide basis.

Referring now to FIG. 4, there is shown in flow diagram form the system maintenance program that is invoked within central processor 700 that monitors system power for an interruption or outage of commercial AC power.

Upon being invoked, the maintenance logic at block 405 polls the reserve system to determine if the system has switched to system battery 500 by reading the appropriate alarm flag stored in system memory 702. The value of the alarm flag is tested at block 410, at which point a transfer to block 411 is made if the system is still being powered by commercial AC power. If, on the other hand, the test performed at block 410 indicates that the system has switched to system battery 500, then the program proceeds to block 415.

At block 415, the program starts a 10 second timer to determine if the loss of AC power is due to a transient condition. During this period, the system is permitted to operate in a normal manner. After starting the 10 second timer, the program proceeds to block 420. Thereafter, during the 10 second period, the program is entered at block 420 rather than at block 400 via secondary entry point 416, as will be discussed below.

The logic contained in blocks 420–430 tests for a transient AC power failure and exits via block 421 in the event AC power is restored during the 10 second interval.

In particular at block 420, the program repeats the test performed by block 410 and proceeds to block 425 if the system is still being served by battery 500. At block 425, system battery 500 is tested via maintenance processor 600 to determine whether battery 500 has sufficient capacity to power the system. If the capacity of battery 500 is low, block 425 transfers to block 435. Otherwise, the program proceeds to block 430, at which point it determines whether the 10 second power transient interval is over. If the 10 second interval is still being timed, the program exits via block 431 and is reentered thereafter via blocks 416 and 420, respectively. Otherwise, i.e., if the timer started at block 415 reaches 10 seconds and commercial AC power has not been restored, the program proceeds to block 435.

At block 435, the program turns off all circuit carrier power supplies via each lead STOP thereby shedding system traffic to conserve system battery 500. The program also starts a 10 minute timer and effects an emergency transfer in which certain ones of the system station sets are automatically switched to central office lines. Further at block 435, all recent changes made to central processor memory 702 are transferred to tape unit 800.

The remaining logic of FIG. 4 automatically restores service in the event that commercial AC power is restored within the 10 minute interval, and in the event that the contents of system memory 702 has not been corrupted by the power failure.

In particular, blocks 440-455 comprise a logic loop which is invoked during the 10 minute interval and which tests for the restoration of AC power and low system battery 500. As discussed in connection with block 410, block 440 determines if the system is being powered by battery 500. If it is not, the program transfers from block 440 to block 445, at which point the system is restored to service. Block 445 will be discussed in more detail in connection with FIG. 5. If the system is still being powered by reserve battery 500 (no AC power) then the program proceeds to block 450.

Block 450 tests the capacity of battery 500 via unit 510 and maintenance processor 600 to determine whether the capacity of battery 500 has fallen to a predetermined threshold during the 10 minute interval. If it has, block 450 transfers to block 460 at which point the system disables itself. Otherwise, the program proceeds to block 455 at which point the 10 minute timer is tested. During the 10 minute period, the program exits via block 451 and is reentered via blocks 436 and 440 to continue its check on the restoration of AC power.

If it is determined at block 455 that the 10 minute interval is over, then a transfer to block 460 is executed. At block 460, central processor 700 notifies maintenance processor 600 to disconnect battery 500 from the system thereby disabling the system. This action prevents the remaining capacity of battery 500 from being completely expended and thereby allows battery 500 to be immediately reused and readily recharged upon the restoration of AC power.

Referring now to FIG. 5, there is shown a detailed flow chart of block 445 of FIG. 4. At block 500 of block 445 certain preselected locations of system memory 702 are read and tested against preset values or information. These preset values are stored in selected memory 702 locations (FIG. 6) whenever the system is loaded via tape unit 800. If the contents of each of the preselected system memory locations equals its respective preset value, the system program concludes that system memory had not been affected by the AC power failure and transfers to block 525. Otherwise, i.e., if the logic at block 500 finds that the contents of each preselected system memory location does not equal its respective preset value, then the program transfers to block 505, whereat the system automatically reloads itself via tape unit 800. Upon completing the reloading process, the program reinitializes system carrier circuits at block 525 and resumes communication service, or call processing, by accepting new call originations, as indicated by block 510.

The foregoing merely illustrates the principles of the invention. Those skilled in the art will be able to devise other arrangements which, although not explicitly disclosed herein, embody those principles. For example, the functions performed by maintenance processor 600 can be merged with the functions performed by central processor 700 thereby eliminating a circuit element. Further, the threshold discussed above in connection with traffic overload could be eliminated and the decision as to whether the traffic across circuit carriers is unbalanced could be based solely on whether there is a substantial disparity between the level of traffic that is processed by the suspected circuit carrier and the level of traffic that is processed by other system circuit carriers at the time of receiving a transient power alarm.

What is claimed is:

1. A power monitoring arrangement for a communication system having a plurality of circuit carriers, said arrangement comprising,
   means for receiving a power alarm generated by at least one of said circuit carriers, and
   means responsive to said power alarm for providing an output if at least there was at substantially the time said power alarm was generated a substantial disparity between the level of traffic being processed by said one circuit carrier and the level of traffic being processed by at least one other of said circuit carriers.

2. A power monitoring arrangement for a communication system having a plurality of circuit carriers, said arrangement comprising,
   means for receiving a power alarm from at least one of said circuit carriers, and
   means responsive to said power alarm for providing an output if the level of traffic being processed by said one circuit carrier was at least at a predetermined threshold, and there was a substantial disparity between said one circuit carrier traffic level and the level of traffic being processed by at least one other of said circuit carriers.

3. The invention set forth in claim 2 wherein said output is an alarm message indicative of improper traffic grading across said circuit carriers.

4. The invention set forth in claim 2 wherein said arrangement further includes,
   a system battery for powering said communication system during a loss of commercial AC power,
   means for measuring the time that said system is solely powered by said battery,
   means for shedding traffic when said measured time reaches a first threshold, and
   means for disabling said system when said measured time reaches a second threshold.

5. The invention set forth in claim 4 wherein said system includes at least a first battery feed circuit and said shedding means is adapted to remove power from said battery feed circuit.

6. The invention set forth in claim 4 wherein said arrangement further includes means for restoring communication service if AC power is restored before said measured time reaches said second threshold.

7. The invention set forth in claim 6 wherein said restoring means is operative for reloading system memory from a tape unit prior to restoring said communication system to service when the contents of particular system memory locations have been affected by said loss of AC power.

8. A power monitoring arrangement for a communication system having a plurality of circuit carriers, said arrangement comprising,
   means for receiving a power alarm from at least one of said carrier circuits,
   means responsive to receipt of a power alarm from an individual one of said circuit carriers for determining at least if the level of traffic being processed by said one circuit carrier has reached a traffic threshold, and
   means for providing a first output when said at least one circuit carrier traffic level is below said traffic threshold and for providing a second output when said one circuit carrier traffic level is at least at said traffic threshold and there is a substantial disparity at the time of receipt of said at least one circuit carrier power alarm between the level of traffic being processed by said at least one circuit carrier and the level of traffic being processed by others of said circuit carriers.

9. The invention set forth in claim 8 wherein said first output is a transient power alarm message and said second output is an alarm message indicative of improper traffic grading across said circuit carriers.

10. The invention set forth in claim 8 wherein said arrangement further includes, a system battery for powering said communication system during a loss of commercial AC power, means for monitoring the time that said system is solely powered by said battery, and means for shedding system traffic when said monitored time reaches a first threshold, and means for disabling said system when said monitored time reaches a second threshold.

11. The invention in claim 10 wherein said arrangement includes at least a first battery feed circuit and said shedding means is adapted to remove power from said battery feed circuit.

12. The invention set forth in claim 10 wherein said arrangement includes means for restoring communication service if AC power is restored to said communication system prior to said monitored time reaching said second threshold.

13. The invention set forth in claim 12 wherein said restoring means is operative for reloading system memory from a tape unit when the contents of particular system memory locations have been affected by said loss of AC power.

14. A power monitoring arrangement for a communication system having a plurality of circuit carriers, said arrangement comprising, means for receiving power alarms from at least one of said circuit carriers, and means operative when the rate of occurrence of said power alarms reaches a predefined system alarm rate for providing an output if, at substantially the time of reaching said system alarm rate, there was at least a substantial disparity between the level of traffic being processed by said one circuit carrier and the level of traffic being processed by at least one other of said circuit carriers.

* * * * *